(12) United States Patent
Miyoshi

(10) Patent No.: US 8,239,164 B2
(45) Date of Patent: Aug. 7, 2012

(54) STATISTICS ESTIMATION APPARATUS, STATISTICS ESTIMATION PROGRAM, AND STATISTICS ESTIMATION METHOD

(75) Inventor: Ikuo Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 12/546,200

(22) Filed: Aug. 24, 2009

(65) Prior Publication Data

US 2009/0319226 A1 Dec. 24, 2009

(30) Foreign Application Priority Data

Sep. 4, 2008 (JP) ................................. 2008-226706

(51) Int. Cl.
*G06F 17/18* (2006.01)
(52) U.S. Cl. ...................................................... 702/179
(58) Field of Classification Search .................... 702/179
See application file for complete search history.

(56) References Cited

U.S. PATENT DOCUMENTS 7,007,270 B2 2/2006 Martin et al.
2002/0166112 A1* 11/2002 Martin et al. ................. 717/124

FOREIGN PATENT DOCUMENTS

JP 2004-530193 9/2004

* cited by examiner

*Primary Examiner* — Tung S Lau
(74) *Attorney, Agent, or Firm* — Staas & Halsey LLP

(57) ABSTRACT

A statistics estimation apparatus that calculates an estimated statistic value of executed program comprises an executer that executes a target program using the number of data that is smaller than the number of data intended to be executed, and calculates a partial process statistic of a processor which executes the partial processes of the program, for each of the numbers of data and each of the partial processes, a creator which creates a mathematical formula for calculating an overall statistic of the processor when a whole program is executed with the number of data intended for execution, based on the calculated partial process statistic and the number of processed data when the partial process statistic is calculated, and a calculator that calculates an estimated statistic when the program is executed with the number of data intended for execution, based on the created mathematical formula.

14 Claims, 21 Drawing Sheets

FIG. 2A

| PROBLEM SIZE (N) | ACTUALLY MEASURED VALUE OF EXECUTION TIME (SEC) |
|---|---|
| 1000 | 0.2 |
| 2000 | 1.3 |
| 3000 | 3.3 |
| 4000 | 5.6 |
| 5000 | 10.8 |
| 6000 | 17.6 |
| 7000 | 27.6 |
| 8000 | 40.4 |
| 9000 | 57.0 |
| 10000 | 77.9 |

FIG. 2B

| PROBLEM SIZE (N) | ESTIMATED VALUE OF EXECUTION TIME (SEC) | ACTUALLY MEASURED VALUE OF EXECUTION TIME (SEC) | ESTIMATED ERROR (%) |
|---|---|---|---|
| 6000 | 18.9 | 17.6 | +7.61 |
| 7000 | 31.3 | 27.6 | +13.55 |
| 8000 | 49.0 | 40.4 | +21.17 |
| 9000 | 72.8 | 57.0 | +27.69 |
| 10000 | 103.8 | 77.9 | +33.28 |

FIG. 3A

```
void
dgemm(const char *transa, const char *transb, const int *m, const int *n, const int *k,
      const double *alpha, const double *a, const int *lda, const double *b, const int *ldb,
      const double *beta, double *c, const int *ldc)
{

PROCESS OF SUBROUTINE dgemm
    return;
}
```

FIG. 3B

```
void
dgemm(const char *transa, const char *transb, const int *m, const int *n, const int *
      const double *alpha, const double *a, const int *lda, const double *b, const int *ldb,
      const double *beta, double *c, const int *ldc)
{
    record_num_of_retired_instruction(0x2a9583a3d8); /* CAPABILITY OF OUTPUTTING THE NUMBER
      OF EXECUTIVE INSTRUCTIONS TO LOG  */
    PROCESS OF SUBROUTINE dgemm
    re_cord_num_of_retired_instruction(0x2a9583a510); /* CAPABILITY OF OUTPUTTING THE NUMBER
      OF EXECUTIVE INSTRUCTIONS TO LOG  */
    return;
}
```

FIG. 4

| INSTRUCTION ADDRESS | THE CUMULATIVE NUMBER OF EXECUTIVE INSTRUCTIONS | NAME OF FUNCTION AND TYPE (CALLING OF OR RETURNING FROM FUNCTION) (FOR REFERENCE) |
|---|---|---|
| 0x401ee0 | 2987 | CALLING OF _start () |
| 0x434700 | 9005 | CALLING OF __libc_csu_init() |
| 0x401b48 | 9317 | CALLING OF _init() |
| 0x401f0c | 9624 | CALLING OF call_gmon_start() |
| 0x401f22 | 9933 | RETURNING FROM call_gmon_start() |
| OMISSION | | |
| 0x408a5d | 1200017 | RETURNING FROM HPL_lmul() |
| 0x4089fa | 1200360 | CALLING OF HPL_lmul() |
| 0x408a5d | 1200689 | RETURNING FROM HPL_lmul() |
| 0x4089fa | 1201032 | CALLING OF HPL_lmul() |
| 0x408a5d | 1201361 | RETURNING FROM HPL_lmul() |
| OMISSION | | |
| 0x434794 | 21575337 | RETURNING FROM __libc_csu_fini() |
| 0x4347d8 | 21575646 | CALLING OF _fini() |
| 0x401f30 | 21575954 | CALLING OF __do_global_dtors_aux() |
| 0x401f64 | 21576298 | RETURNING FROM __do_global_dtors_aux() |
| 0x4347e5 | 21576607 | RETURNING FROM _fini() |

FIG. 5

| INSTRUCTION EXECUTION SECTION START ADDRESS | INSTRUCTION EXECUTION SECTION END ADDRESS | THE NUMBER OF EXECUTIVE INSTRUCTIONS IN SECTION |
|---|---|---|
| 0x401ee0 | 0x434700 | 6018 |
| 0x434700 | 0x401b48 | 312 |
| 0x401b48 | 0x401f0c | 307 |
| 0x401f0c | 0x401f22 | 309 |
| 0x401f22 | 0x401f70 | 2593 |
| OMISSION | | |
| 0x408a5d | 0x4089fa | 343 |
| 0x4089fa | 0x408a5d | 329 |
| 0x408a5d | 0x4089fa | 343 |
| 0x4089fa | 0x408a5d | 329 |
| 0x408a5d | 0x4089fa | 343 |
| OMISSION | | |
| 0x434760 | 0x434794 | 317 |
| 0x434794 | 0x4347d8 | 309 |
| 0x4347d8 | 0x401f30 | 308 |
| 0x401f30 | 0x401f64 | 344 |
| 0x401f64 | 0x4347e5 | 309 |

FIG. 6

| INSTRUCTION EXECUTION SECTION START ADDRESS | INSTRUCTION EXECUTION SECTION END ADDRESS | THE NUMBER OF TIMES OF SECTION EXECUTION | THE TOTAL NUMBER OF EXECUTIVE INSTRUCTIONS IN SECTION |
|---|---|---|---|
| 0x408a5d | 0x4089fa | 20818 | 8043872 |
| 0x4089fa | 0x408a5d | 20820 | 7674627 |
| 0x2a95d72ad3 | 0x2a95d7251a | 1 | 715876 |
| 0x2a95c7255 | 0x2a95ba2fbc | 50 | 674028 |
| 0x433e64 | 0x406d7e | 1 | 556012 |
| 0x2a95bfc018 | 0x2a95bfc101 | 48 | 376893 |
| 0x429890 | 0x42a3d9 | 1 | 231050 |
| 0x408a5e | 0x2a9585de88 | 5 | 162968 |
| 0x2a9582b498 | 0x2a9582b4ca | 251 | 140758 |
| 0x407124 | 0x40e04d | 1 | 128191 |
| THE REST IS OMITTED | | | |

FIG. 7

| INSTRUCTION EXECUTION SECTION START ADDRESS | INSTRUCTION EXECUTION SECTION END ADDRESS | THE TOTAL NUMBER OF EXECUTIVE INSTRUCTIONS IN SECTION | | | | | |
|---|---|---|---|---|---|---|---|
| | | N=50 | N=100 | N=200 | N=400 | N=800 | |
| 0x408a5d | 0x4089fa | 2068619 | 8043872 | 31786451 | 126109763 | 502471549 | |
| 0x4089fa | 0x408a5d | 1962531 | 7674627 | 304077772 | 120760686 | 481378572 | |
| 0x2a95c7255c | 0x2a95ba2fbc | 130072 | 674028 | 4805542 | 37760208 | 302460721 | |
| 0x408a5e | 0x2a9585de88 | 54964 | 162968 | 582594 | 2197895 | 8553089 | |
| 0x2a95ba3086 | 0x2a95c72668 | 13145 | 67989 | 247400 | 1066928 | 4497430 | |
| 0x2a95c72747d | 0x2a95ba2fbc | 1715 | 40730 | 223203 | 1042482 | 4471425 | |
| 0x2a95851730 | 0x2a9583a5fd | 32829 | 94297 | 315374 | 1138052 | 4294945 | |
| 0x2a9585de88 | 0x2a9585dead | 37127 | 97237 | 311174 | 1055955 | 3873341 | |
| 0x40f920 | 0x40fd33 | 3998 | 24239 | 113016 | 501842 | 2027593 | |
| 0x2a9582b498 | 0x2a9582b4ca | 72661 | 140758 | 293782 | 596111 | 1220027 | |
| THE REST IS OMITTED | | | | | | | |

FIG. 8

| INSTRUCTION EXECUTION SECTION START ADDRESS | INSTRUCTION EXECUTION SECTION END ADDRESS | COEFFICIENT α | COEFFICIENT β | COEFFICIENT γ | COEFFICIENT δ | COEFFICIENT OF DETERMINATION |
|---|---|---|---|---|---|---|
| 0x408a5d | 0x4089fa | 0.000609448 | 781.1947356 | 2783.113875 | -31737.61905 | 0.999999998 |
| 0x4089fa | 0x408a5d | 0.000547274 | 748.7637469 | 2409.922015 | -38501.85714 | 0.999999997 |
| 0x2a95c7255c | 0x2a95ba2fbc | 0.595443064 | -5.319987205 | 1239.227669 | 7286.928571 | 1 |
| 0x408a5e | 0x2a9 585de88 | -4.75857E-05 | 13.07499934 | 250.7267035 | 8858.047619 | 0.999999912 |
| 0x2a95ba3086 | 0x2a95c72668 | 0.000470556 | 6.854985696 | -174.200638 | 8738.714286 | 0.999993373 |
| 0x2a95c72774d | 0x2a95ba2fbc | 4.28928E-0 | 7.464412664 | -389.2007753 | 3378.928571 | 0.999999701 |
| 0x2a95851730 | 0x2a9583a5fd | -0.000107066 | 6.445149803 | 277.8216347 | 2606.071429 | 0.999999976 |
| 0x2a9585dead | 0x2a9585dead | 8.82156E-05 | 5.391910367 | 473.4839772 | -1457.380952 | 0.999998888 |
| 0x40f920 | 0x40fd33 | -0.000452692 | 3.758778018 | -188.7322071 | 4749.166667 | 0.999999161 |
| 0x2a9582b498 | 0x2a9582b4ca | -0.000107419 | 0.210086273 | 1426.043662 | -787.14285714 | 0.9999982453 |

THE REST IS OMITTED

FIG. 9

| PROBLEM SIZE (N) | ESTIMATED VALUE OF THE NUMBER OF EXECUTIVE INSTRUCTIONS | ACTUALLY MEASURED VALUE OF THE NUMBER OF EXECUTIVE INSTRUCTIONS | ESTIMATED ERROR (%) |
|---|---|---|---|
| 1000 | 2.20E+09 | 7.73E+08 | +184.19 |
| 2000 | 1.11E+10 | 5.45E+09 | +103.85 |
| 3000 | 3.03E+10 | 1.76E+10 | +72.32 |
| 4000 | 6.35E+10 | 4.08E+10 | +55.51 |
| 5000 | 1.14E+11 | 7.87E+10 | +44.99 |
| 6000 | 1.86E+11 | 1.35E+11 | +37.87 |
| 7000 | 2.82E+11 | 2.13E+11 | +32.70 |
| 8000 | 4.07E+11 | 3.16E+11 | +28.80 |
| 9000 | 5.63E+11 | 4.48E+11 | +25.73 |
| 10000 | 7.55E+11 | 6.13E+11 | +23.26 |

FIG. 10

| CLOCK FREQUENCY | 2.66GHz |
|---|---|
| THE MAXIMUM NUMBER OF EXECUTIVE INSTRUCTIONS PER ONE CLOCK | 4 |

FIG. 11

| PROBLEM SIZE (N) | ESTIMATED EXECUTION TIME (SEC) | ACTUALLY MEASURED VALUE OF EXECUTION TIME (SEC) | ESTIMATED ERROR (%) |
|---|---|---|---|
| 1000 | 0.1 | 0.2 | -63.66 |
| 2000 | 0.5 | 1.3 | -60.54 |
| 3000 | 1.7 | 3.3 | -49.77 |
| 4000 | 3.8 | 5.6 | -31.38 |
| 5000 | 7.4 | 10.8 | -31.43 |
| 6000 | 12.9 | 17.6 | -27.94 |
| 7000 | 20.0 | 27.6 | -27.51 |
| 8000 | 29.7 | 40.4 | -26.43 |
| 9000 | 42.2 | 57.0 | -26.04 |
| 10000 | 57.7 | 77.9 | -25.99 |

FIG. 14

| PROBLEM SIZE (N) | THE TOTAL NUMBER OF EXECUTIVE INSTRUCTIONS IN SECTION |
|---|---|
| 1000 | 6784448 |
| 2000 | 48037787 |
| 3000 | 159872284 |
| 4000 | 37761037 |
| 5000 | 736942296 |
| 6000 | 1274271194 |
| 7000 | 2024487896 |
| 8000 | 3024466681 |
| 9000 | 4308792237 |
| 10000 | 5912282242 |

FIG. 15

| FORM OF MODEL FORMULA | COEFFICIENT OF DETERMINATION | COEFFICIENT $\alpha$ |
|---|---|---|
| $\alpha \times N + \beta$ | 0.86144148 | 622890.1064 |
| $\alpha \times N^2 + \beta \times N + \gamma$ | 0.997061776 | 976.9467667 |
| $\alpha \times N^3 + \beta \times N^2 + \gamma \times N + \delta$ | 0.999999987 | 0.594527729 |
| $\alpha \times \log(N) + \beta$ | 0.615242001 | 1507707406.7 |
| $\alpha \times \log(N)^2 + \beta \times \log(N) + \gamma$ | 0.915744053 | 105812438.5 |
| $\alpha \times \log(N)^3 + \beta \times \log(N)^2 + \gamma \times \log(N) + \delta$ | 0.990075133 | 64066905.28 |
| $\alpha \times N \times \log(N) + \beta$ | 0.885011554 | 60664.30253 |
| $\alpha \times N^2 \times \log(N)^2 + \beta \times N \times \log(N) + \gamma$ | 0.998760714 | 8.37392459 |
| $\alpha \times N^3 \times \log(N)^3 + \beta \times N^2 \times \log(N)^2 + \gamma \times N \times \log(N) + \delta$ | 0.999997734 | 0.000350755 |

FIG. 16

| PROBLEM SIZE (N) | THE NUMBER OF TIMES OF SECTION EXECUTION | THE AVERAGE NUMBER OF EXECUTIVE INSTRUCTIONS IN SECTION |
|---|---|---|
| 1000 | 50 | 13568.96 |
| 2000 | 102 | 47095.95098 |
| 3000 | 153 | 104492.0523 |
| 4000 | 205 | 184200.1805 |
| 5000 | 256 | 287868.3438 |
| 6000 | 308 | 413724.6558 |
| 7000 | 359 | 564033.1365 |
| 8000 | 411 | 735880.0024 |
| 9000 | 463 | 930624.7019 |
| 10000 | 514 | 1150249.498 |

FIG. 17

| PROBLEM SIZE (N) | THE NUMBER OF TIMES OF SECTION EXECUTION | | THE AVERAGE NUMBER OF EXECUTIVE INSTRUCTIONS IN SECTION | |
|---|---|---|---|---|
| | COEFFICIENT OF DETERMINATION | COEFFICIENT $\alpha$ | COEFFICIENT OF DETERMINATION | COEFFICIENT $\alpha$ |
| $\alpha \times N + \beta$ | 0.999996573 | 0.515575758 | 0.949257077 | 1262.85582 |
| $\alpha \times N^2 + \beta \times N + \gamma$ | 0.999996711 | 7.57576E-07 | 0.999999023 | 1.154131837 |
| $\alpha \times N^3 + \beta \times N^2 + \gamma \times N + \delta$ | 0.99999673 | 1.1655E-09 | 0.999999036 | -2.42726E |
| $\alpha \times \log(N) + \beta$ | 0.905552601 | 140.4633881 | 0.745000639 | 320297.2699 |
| $\alpha \times \log(N)^2 + \beta \times \log(N) + \gamma$ | 0.996587456 | 44.74160337 | 0.969145934 | 176498.5415 |
| $\alpha \times \log(N)^3 + \beta \times \log(N)^2 + \gamma \times \log(N) + \delta$ | 0.999952104 | 10.47160092 | 0.998204713 | 77366.06575 |
| $\alpha \times N \times \log(N) + \beta$ | 0.998603549 | 0.049505104 | 0.964215627 | 122.2951198 |
| $\alpha \times N^2 \times \log(N)^2 + \beta \times N \times \log(N) + \gamma$ | 0.999898604 | -6.86426E-07 | 0.999936029 | 0.009063093 |
| $\alpha \times N^3 \times \log(N)^3 + \beta \times N^2 \times \log(N)^2 + \gamma \times N \times \log(N) + \delta$ | 0.999981049 | 6.95654E-11 | 0.999995824 | -1.4894E-07 |

FIG. 18

| PROBLEM SIZE (N) | THE OVERALL NUMBER OF EXECUTIVE INSTRUCTIONS WITHOUT ALTERATION PROCESSING |
|---|---|
| 1000 | 5360444 |
| 2000 | 15314550 |
| 4000 | 70279415 |
| 8000 | 420683374 |

FIG. 19

| PROBLEM SIZE (N) | ESTIMATED VALUE OF THE NUMBER OF EXECUTIVE INSTRUCTIONS | ACTUALLY MEASURED VALUE OF EXECUTIVE INSTRUCTIONS | ESTIMATED ERROR (%) |
|---|---|---|---|
| 1000 | 7.73E+08 | 7.73E+08 | +0.04 |
| 2000 | 5.46E+09 | 5.45E+09 | +0.10 |
| 3000 | 1.76E+10 | 1.76E+10 | +0.15 |
| 4000 | 4.09E+10 | 4.08E+10 | +0.17 |
| 5000 | 7.88E+10 | 7.87E+10 | +0.13 |
| 6000 | 1.35E+11 | 1.35E+11 | +0.12 |
| 7000 | 2.13E+11 | 2.13E+11 | +0.12 |
| 8000 | 3.16E+11 | 3.16E+11 | +0.12 |
| 9000 | 4.49E+11 | 4.48E+11 | +0.13 |
| 10000 | 6.13E+11 | 6.13E+11 | +0.13 |

FIG. 20A

| PROBLEM SIZE (N) | THE AVERAGE NUMBER OF EXECUTIVE INSTRUCTIONS PER ONE CLOCK | THE AVERAGE NUMBER OF EXECUTIVE INSTRUCTIONS PER ONE SECOND |
|---|---|---|
| 5000 | 2.97 | 7.91E+09 |
| 6000 | 3.10 | 8.25E+09 |
| 7000 | 3.11 | 8.26E+09 |
| 8000 | 3.02 | 8.03E+09 |
| 9000 | 3.09 | 8.21E+09 |
| 10000 | 3.16 | 8.40E+09 |

FIG. 20B

| PROBLEM SIZE (N) | ESTIMATED EXECUTION TIME (SEC) | ACTUALLY MEASURED VALUE OF EXECUTION TIME (SEC) | ESTIMATED ERROR (%) |
|---|---|---|---|
| 5000 | 10.0 | 10.8 | -7.78 |
| 6000 | 16.4 | 17.6 | -7.04 |
| 7000 | 25.8 | 27.6 | -6.65 |
| 8000 | 39.4 | 40.4 | -2.54 |
| 9000 | 54.6 | 57.0 | -4.15 |
| 10000 | 73.0 | 77.9 | -6.27 |

FIG. 21

$$Time(N) = \sum_{i=1}^{M} \frac{Instr(N,i)}{IPS(N,i)}$$

N: PROBLEM SIZE

M: NUMBER OF PARTIAL PROCESS WHICH STRONGLY AFFECT THE NUMBER OF EXECUTIVE INSTRUCTIONS OF WHOLE PROGRAM

Time(N): OPERATION TIME OF WHOLE PROGRAM

Instr(N,i): NUMBER OF EXECUTIVE INSTRUCTIONS OF ith PARTIAL PROCESS

IPS(N,i): AVEREGE NUMBER OF EXECUTIVE INTSTRUCTIONS PER 1 SECOND OF THE ith PARTIAL PROCESS

STATISTICS ESTIMATION APPARATUS, STATISTICS ESTIMATION PROGRAM, AND STATISTICS ESTIMATION METHOD

CROSS-REFERENCE TO RELATED APPLICATIONS

This application is based upon and claims the benefit of priority of the prior Japanese Patent Application No. 2008-226706, filed on Sep. 4, 2008, the entire contents of which are incorporated by reference herein.

FIELD

Embodiments discussed herein relate to a statistics estimation apparatus, a statistics estimation program, and a statistics estimation method.

BACKGROUND

When a computer program whose execution time is long is to be executed, estimating the execution time of the program in advance is preferable. For example, when a batch job management system is used, a user may be required to select an appropriate job queue according to the execution time of a job to be submitted.

Examples for estimating the execution time of a program include creating a model for estimating the execution time, providing an execution condition to the created model, and estimating the execution time of the program. When the execution time of a program is long, and there is no execution example similar to an execution condition for which execution time is to be estimated exists, an estimation of the execution time by using an execution time estimation model is necessary.

An estimation method including preparing a model of a target processor on the basis of a set of benchmark programs, correlating software to be estimated to the benchmark programs, applying the correlated software to the model, and determining an estimated value of the execution time of the software is known.

Patent Document 1: National Publication of International Patent Application No. 2004-530193

The work of thoroughly understanding and grasping the processing contents of a targeted program in order to create the execution time estimation model of the program requires considerable labor. Especially, in the case of a program created by another person, a large amount of labor is required, and the cost of the work is not negligible.

Even if an algorithm used in a targeted program is qualitatively apparent, an actual execution time in a quantitative sense is generally unclear.

SUMMARY

According to an aspect of the invention, a statistics estimation apparatus that calculates an estimated statistic value of executed program comprises an executer that executes a target program using a number of data that is smaller than a number of data intended to be executed, and calculates a partial process statistic of a processor which executes the partial processes of the program, for each of the numbers of data and each of the partial processes, a creator which creates a mathematical formula for calculating an overall statistic of the processor when a whole program is executed with the number of data intended for execution, based on the calculated partial process statistic and the number of processed data when the partial process statistic is calculated, and a calculator that calculates an estimated statistic when the program is executed with the number of data intended for execution, based on the created mathematical formula.

The above-described embodiments of the present invention are intended as examples, and all embodiments of the present invention are not limited to including the features described above.

BRIEF DESCRIPTION OF THE DRAWINGS

FIGS. 2A and 2B illustrate the correspondence between a problem size and an actually measured value of an execution time and the correspondence among a problem size, an estimated value of an execution time, an actually measured value of the execution time, and an estimated error;

FIGS. 3A and 3B illustrate program alteration according to the embodiment;

FIG. 4 illustrates the correspondence among an instruction address, the cumulative number of executive instructions, and the name of a function and a type or calling of or returning from the function;

FIG. 5 illustrates the correspondence among an instruction execution section start address, an instruction execution section end address, and the number of executive instructions in section, according to the embodiment;

FIG. 6 illustrates the correspondence among an instruction execution section start address, an instruction execution section end address, the number of times of section execution, and the number of executive instructions in section, according to the embodiment;

FIG. 7 illustrates the correspondence among an instruction execution section start address, an instruction execution section end address, and the total numbers of executive instructions in section for respective problem sizes, according to the embodiment;

FIG. 8 illustrates the correspondence among an instruction execution section start address, an instruction execution section end address, and the values of coefficients of a model formula, according to the embodiment;

FIG. 9 illustrates the correspondence among a problem size, an estimated value of the number of executive instructions, an actually measured value of the number of executive instructions, and an estimated error, according to the embodiment;

FIG. 10 illustrates the specifications of a processor according to the embodiment;

FIG. 11 illustrates the correspondence among a problem size, an estimated execution time, an actually measured value of an execution time, and an estimated error, according to the embodiment;

FIG. 14 illustrates the correspondence between a problem size and the total number of executive instructions in section;

FIG. 15 illustrates the correspondence among a model formula, a coefficient of determination, and a coefficient $\alpha$;

FIG. 16 illustrates the correspondence among a problem size, the number of times of section execution, and the average number of executive instructions in section;

FIG. 17 illustrates the correspondence among a problem size, a coefficient of determination and a coefficient $\alpha$ for the number of times of section execution, and a coefficient of determination and a coefficient α for the average number of executive instructions in section;

FIG. 18 illustrates the correspondence between a problem size and the overall number of executive instructions without alteration processing;

FIG. 19 illustrates the correspondence among a problem size, an estimated value of the number of executive instructions, an actually measured value of the number of executive instructions, and an estimated error;

FIGS. 20A and 20B illustrate an example of the correspondence among a problem size, the average number of executive instructions per one clock, and the average number of executive instructions per one second and an example of the correspondence among a problem size, an estimated execution time, an actually measured value of an execution time, and an estimated error; and FIG. 21 illustrates a formula for calculating an execution time.

DETAILED DESCRIPTION OF THE PREFERRED EMBODIMENTS

Figure 1:
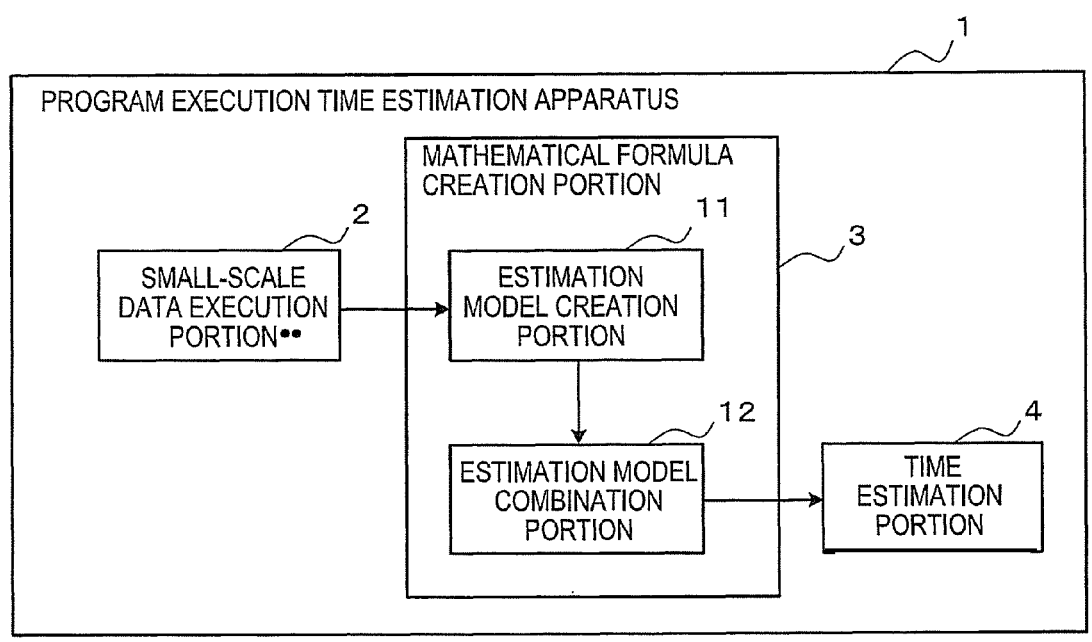
FIG. 1 illustrates a program execution time estimation apparatus according to an embodiment.

Reference may now be made in detail to embodiments of the present invention, examples of which are illustrated in the accompanying drawings, wherein like reference numerals refer to like elements throughout.

In embodiments described below, a targeted computer program is assumed to be a program intended for the field of scientific and technological calculation. In particular, an example will be described below in which a program for solving dense-matrix simultaneous linear equations is used as a program for which an execution time is to be estimated. These embodiments assume a case where a rough estimation of a program execution time can be obtained using a limited number of parameters, including the number of items to be inputted as parameters and the amount of inputted data such as the number of bytes of inputted data. Additionally, assume that, in a program according to the embodiments, execution of the program using small-scale data is allowed to be performed a plurality of times as long as the execution of the program takes a short time.

In the embodiments described below, an execution time at the time of program execution using large-scale data is estimated from statistical data derived from program execution using small-scale data under the above-described assumption.

The embodiments described below assume an example in which a targeted program is executed in a plurality of patterns, e.g., under each of a plurality of different execution conditions (e.g., the amount N of inputted data=100, 200, and 300). At this time, a logical statistic which can be measured by computer hardware, such as the number of executive instructions, is measured for each of partial processes constituting the program. A logical statistic to be measured, such as the number of executive instructions, is advantageous in terms of measurement accuracy in that resolution is extremely high compared to that of an actual measured value of an elapsed time on the order of nanoseconds, and reproducibility is higher than that of an actual measured value of an elapsed time under the same execution condition.

Accordingly, a logical statistic is regressively analyzed for each of the partial processes constituting the program, and a regression formula is obtained on the basis of a simple model formula such as $\alpha \times N + \beta$, $\alpha \times N^2 + \beta \times N + \gamma$, or $\alpha \times \log(N) + \beta$. At this time, a subroutine or a repetitive process using a FOR statement is set as a partial process serving as a unit of regression analysis. Such a partial process is assumed to be obtained by appropriately segmenting a program such that a logical statistic such as the number of executive instructions can be easily modeled. Consequently, high-accuracy statistic modeling is performed for each of subroutines or repetitive processes using FOR statements, and a mathematical formula capable of calculating a high-accuracy statistic for the whole program is created by adding together the modeled statistics for the partial processes.

Estimating an execution time for large-scale data from statistical data derived from small-scale data is possible, by designating a parameter corresponding to an execution condition for which estimation is desired (e.g., the amount N of data=10,000) for an execution time estimation model created in the above-described manner.

FIG. 1 illustrates a processing apparatus according to a first embodiment which estimates a program execution time. The processing apparatus 1 operates as a statistics estimation apparatus includes a data executer 2, a mathematical formula creator 3, and a time estimator 4 (estimation time calculator).

The data executer 2 executes a program for which an execution time is to be estimated in a plurality of patterns using a piece of small-scale data. The amount of the small-scale data is smaller than the amount of inputted data intended for execution. The amount of data intended for execution also referred to as "the number of pieces of data". The data executer 2 calculates, for each piece of small-scale data, the number of executive instructions of a processor for each subroutine (e.g., each partial process), that is, a partial process statistic. Note that the term "the amount of inputted data intended for execution" corresponds to the term "large-scale data" described above and will also be referred to as "the number of pieces of data" hereinafter.

The mathematical formula creator 3 creates a mathematical formula for calculating the number of executive instructions of the processor when the whole of the program for which an execution time is to be estimated is executed with the amount of inputted data intended for execution, i.e., an overall statistic. The mathematical formula creator 3 creates the mathematical formula based on the number of executive instructions for each subroutine calculated by the data executer 2, and the amount of inputted data when the number of executive instructions is calculated.

The time estimator 4 calculates an estimated execution time when a program for which an execution time is to be estimated is executed with data of a scale intended for execution. The time estimator 4 calculates the estimated execution time based on a mathematical formula created by the mathematical formula creator 3.

The mathematical formula creator 3 includes an estimation model creator 11 (regression formula creator) and an estimation model combiner 12 (regression formula combiner).

The estimation model creation unit 11 calculates, for each subroutine, coefficients of a model formula for regression analysis based on the number of executive instructions for each subroutine calculated by the data executer 2 and the amount of inputted data. The estimation model creator 11 also creates, for each subroutine, a regression formula, i.e., an estimation model by setting the calculated coefficients in the model formula.

The estimation model combiner 12 creates a mathematical formula described above by combining the respective regression formulae for the subroutines created by the estimation model creator 11.

Note that each of the above-described units is implemented when hardware resources such as a CPU and a memory provided in the program execution time estimation apparatus 1 execute a program stored in a storage device.

The operation of the processing apparatus 1 according to the embodiment will be described. Note that, although a program for solving dense-matrix simultaneous linear equations is used as an example of a program for which an execution time is to be estimated, the execution time of the program changes depending on a problem size N. The problem size N is a parameter indicating the amount of data to be inputted at the beginning of execution of the program. FIG. 2A illustrates an example of measured values of the execution time of the program when designating 1,000 to 10,000, in increments of 1,000, as the problem size N. FIG. 2A illustrates actually measured values of the execution time of the program. In the example of FIG. 2A, the execution time increases with an increase in the value of N.

For example, assume here a situation to estimate the program execution time when N=10,000. In this case, regression analysis is performed by, e.g., a model formula with the form $\alpha \times N^3 + \beta \times N^2 + \gamma \times N + \delta$ using actually measured values of the program execution time when N=1,000 to 5,000, and the coefficients of the model formula are calculated. In the above-described example, the coefficients $\alpha$, $\beta$, $\gamma$, and $\delta$ of the model formula are 1.66667E-10, -8.92857E-07, 0.002840476, and -1.96, respectively. An estimated value of the program execution time with respect to the problem size N can be obtained using a formula formed by substituting the calculated coefficients into the model formula. When the program execution times of N=6,000 to 10,000 are estimated using the calculated coefficients and the mathematical formula, "estimated values of the execution time" illustrated in FIG. 2B are obtained. FIG. 2B illustrates an estimated value of the execution time calculated using the above-described mathematical formula, an actually measured value of the execution time, and an estimated error which is an error between the estimated value of the execution time and the actually measured value of the execution time with respect to the problem size N. When N=10,000, the estimated error is +33.28%.

For this reason, in this embodiment, alteration processing is performed on executable binary of the program, and a logical statistic related to execution of the program is measured. FIG. 3A illustrates a part of the program before alteration, and FIG. 3B illustrates a part of the program after alteration. Note that each altered portion of the program is underlined in FIG. 3B, for ease of understanding. In each of a main program and all subroutines in a math library called by the main program, the function record_num_of_retired_instruction is added to the beginning and the end of each subroutine (or the main program), as illustrated in the examples of FIGS. 3A and 3B. The function record_num_of_retired_instruction obtains a value of the number of executive instructions measured by the computer hardware and outputting the value to a log.

As a result of performing such program alteration processing, when the altered program is executed, a log output with the correspondence between an instruction address and the cumulative number of executive instructions is obtained, as illustrated in FIG. 4. Note that the problem size N is 100 in the example illustrated in FIG. 4. The term "the cumulative number of executive instructions" here refers to the cumulative number of instructions executed by the processor since the beginning of execution of the altered program. The term "instruction address" refers to an instruction address in the execution binary at a time point when the cumulative number of executive instructions is measured. Note that FIG. 4 also illustrates the name of a function and a type of calling of or returning from the function for reference purposes.

In the log output in FIG. 4, the difference in the cumulative number of executive instructions between each vertically adjacent two rows is calculated, and the number of executive instructions per instruction execution section is obtained. The numbers of executive instructions can be compiled as in FIG. 5. In FIG. 5, the term "instruction execution section start address" refers to an instruction address in the next previous row in FIG. 4. Additionally, the term "instruction execution section end address" refers to an instruction address in the current row in FIG. 4. Further, the term "the number of executive instructions in section" refers to the number of executive instructions in an instruction execution section indicated by an "instruction execution section start address" and an "instruction execution section end address," i.e., the difference between the "cumulative number of executive instructions" at the "instruction execution section end address" and the "cumulative number of executive instructions" at the "instruction execution section start address." Note that since the amount of data to be illustrated in each of FIGS. 4 and 5 is enormous, the data are partially omitted.

Accumulation is performed for each pair of an instruction execution section start address and an instruction execution section end address on the basis of the compilation result illustrated in FIG. 5. Compilation can be performed as in FIG. 6. In FIG. 6, the term "the number of times of section execution" refers to the number of times an instruction execution section indicated as a pair of an instruction execution section start address and an instruction execution section end address is executed. The term "the total number of executive instructions in section," i.e., partial process statistic refers to the total value of the number of executive instructions in a corresponding instruction execution section. Note that although the compilation illustrated in FIG. 5 has address values and compiled values different from those in FIG. 6, the differences are caused by omissions in FIG. 5.

The altered program is executed while the problem size parameter N is varied through 50, 100, 200, 400, and 800. The total numbers of executive instructions in section for the respective values of the problem size N are compiled in the same manner as in the above-described examples. The result illustrated in FIG. 7 can be obtained. FIG. 7 illustrates the "total number of executive instructions in section" for each problem size. Note that the data executer 2 according to this embodiment obtains the result in FIG. 7 in accordance with the operations described so far.

Further, the total number of executive instructions in the section corresponding to each value of the problem size N is regressively analyzed for each instruction execution section in the table illustrated in FIG. 7. The total number of executive instructions is analyzed using the total number of executive instructions in the section to obtain the values of coefficients $\alpha$, $\beta$, $\gamma$, and $\delta$ in a model formula (e.g., $\alpha \times N^3 + \beta \times N^2 + \gamma \times N + \delta$) arbitrarily defined by a user and a coefficient of determination ($R^2$ value), and an estimated value of the total number of executive instructions in the section is obtained by the model formula using the obtained coefficients and the problem size N. The values in FIG. 8 are obtained. Note that the "coefficient of determination" illustrated in FIG. 8 indicates the degree of deviation of an estimated value of the total number of executive instructions in section obtained by the model formula from the actual total number of executive instructions in section used to create the model formula. The "coefficient of determination" close to "1" indicates that the deviation of the estimated value of the total number of executive instructions in section from the actual total number of executive instructions in section is small. The "coefficient of determination" close to "0" indicates that the deviation of the estimated value of the total number of executive instructions in section from the actual total number of executive instructions in section is large. For this reason, if the "coefficient of determination" is far from "1", it can be judged that the above-described form of the model formula is inappropriate and that a model formula with another form needs to be used. Note that the estimation model creator 11 according to this embodiment performs the above-described processing until the result in FIG. 8 is obtained and sets values of the coefficients α, β, γ, and δ calculated each time in the model formula.

When the values of the coefficients for each instruction execution section of the table illustrated in FIG. 8 are used in combination, the following mathematical formula for estimating the number of executive instructions for the whole program, i.e., an overall statistic can be obtained:

$$0.598217909 \times N^3 + 1566.910443 \times N^2 + 29580.41737 \times N + 2378870.833 \text{ (N: problem size)}$$

Note that the estimation model combiner 12 performs combination processing by using the coefficients in combination in order to calculate the mathematical formula.

The numbers of executive instructions for the whole program when N=1,000 to 10,000 are estimated using a mathematical formula derived from combination processing by the estimation model combiner 12. The result in FIG. 9 is obtained. Note that an actually measured value of the number of executive instructions for each value of the problem size N is also illustrated in FIG. 9, for reference purposes. As seen from the result illustrated in FIG. 9, when N=1,000, the estimated error between an estimated value of the number of executive instructions and an actually measured value of the number of executive instructions is as extremely large as +184.19%. However, the estimated error decreases with an increase in the problem size N. When N=10,000, the estimated error is improved to +23.26%. In summary, the number of executive instructions, i.e., the processing amount of the program for which estimation is to be performed when N=10,000 can be estimated with an error of about 23% only by executing the program five times (with N=50, 100, 200, 400, and 800) while varying the value of the problem size parameter N in the range of up to 800. In one example, the time required to execute the program five times is not more than 1 second in total. An execution time required for estimation can be said to be extremely short compared to a program execution time of 77.9 seconds when N=10,000.

The time estimator 4 (illustrated in FIG. 1) obtains the estimated execution time of the whole program on the basis of a model formula calculated by the estimation model combiner 12 of the mathematical formula creator 3. Assume that a processor of a computer for which an execution time is to be estimated is as illustrated in the hardware specifications in FIG. 10. That is, the processing amount per unit time, e.g., the maximum number of executive instructions per one second of the processor for which an execution time is to be estimated is 10,640,000,000 instructions.

The time estimator 4 divides the number of executive instructions for the whole program for which estimation is to be performed by the maximum number of executive instructions per second, by substituting the problem size N intended for execution into a model formula calculated by the mathematical formula creator 3, thereby obtaining the estimated execution time of the program. For example, when estimated execution times when N=1,000 to 10,000 are obtained, the result in FIG. 11 is obtained. An actually measured value of the program execution time and an estimated error which is an error between an estimated execution time and an actually measured value of the execution time for each value of the problem size N are also illustrated in FIG. 11. As seen from the result in FIG. 11, an estimated error is generated in the range of −25.99% to −63.66%. Since the value of the maximum number of executive instruction per one second prescribed in the hardware specifications is used to estimate the program execution time, an actual execution time can be expected to be not less than the estimated execution time described above.

Figure 12:
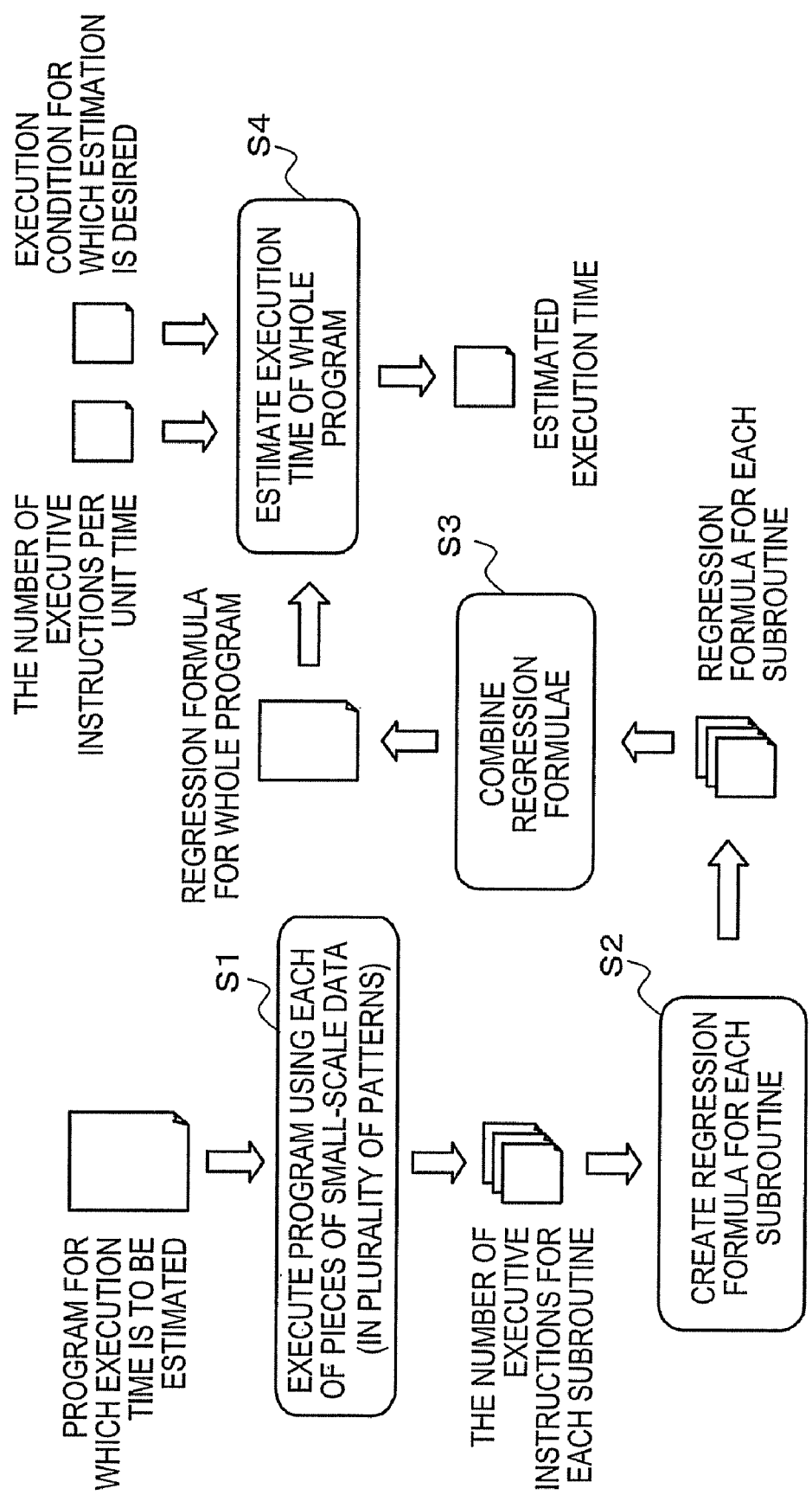
FIG. 12 illustrates the processing operation of the program execution time estimation apparatus according to the embodiment.

The operation of the program execution time estimation apparatus 1 according to this embodiment will be described with reference to FIG. 12.

The data executer 2 (illustrated in FIG. 1) executes a program for which an execution time is to be estimated in a plurality of patterns, e.g., for each of a plurality of pieces of small-scale data defined in advance using the piece of small-scale data as a parameter (S1). At this time, the data executer 2 calculates the number of executive instruction for each subroutine.

The mathematical formula creator 3 creates a mathematical formula for calculating the number of executive instructions of a processor when the whole of the program for which an execution time is to be estimated is executed with data of a scale intended for execution. The mathematical formula creator 3 creates the mathematical formula on the basis of the numbers of executive instructions for the respective subroutines calculated by the data executer 2 and the pieces of small-scale data used to calculate the numbers of executive instructions (S2 and S3).

More specifically, the estimation model creator 11 calculates coefficients of a model formula defined in advance for each subroutine by performing regression analysis using the problem size N, which is the amount of inputted small-scale data, as an explanatory variable on the basis of the number of executive instructions and creates a regression formula for each subroutine by setting the calculated coefficients in the model formula (S2). After that, the estimation model combiner 12 combines the regression formulae for the respective subroutines by adding together coefficients of each type and creates a regression formula for calculating the number of executive instructions of the processor when the whole program for which an execution time is to be estimated is executed with the data of the scale intended for execution (S3).

The time estimator 4 acquires the mathematical formula created by the mathematical formula creator 3, the number of executive instructions per unit time, and an execution condition for which estimation is desired, such as the data of the scale intended for execution. The time estimator 4 then calculates an estimated execution time when the program for which an execution time is to be estimated is executed with the data of the scale intended for execution (S4).

The above embodiment has been described such that $\alpha \times N^3 + \beta \times N^2 + \gamma \times N + \delta$ is an example of the form of a model formula, and only the model formula is used. However, a case where a plurality of model formulae are defined in advance, and one of the model formulae can be selected for each subroutine may be capable of obtaining a higher-accuracy estimation result. For this reason, a processing apparatus formed by providing the mathematical formula creator 3 according to the above embodiment with a model formula selection capability will be described.

A processing apparatus according to a second embodiment has basically the same configuration as in FIG. 1. An estimation model creator 11 of a processing apparatus 1 according to the second embodiment selects, for each subroutine, a model formula most suitable for the subroutine among a plurality of model formulae defined in advance as models of a regression formula. The estimation model creator 11 calculates the coefficients of the selected model formula for each subroutine, thereby creating, for each subroutine, a regression formula for calculating the total number of executive instructions in section from data of a scale intended for execution. Note that other units according to the second embodiment are basically the same as those in the first embodiment, and a description thereof will be omitted.

The processing operation of the processing apparatus 1 according to the second embodiment will be described with reference to FIG. 13. For example, assume that a program for which an execution time is to be estimated includes an initialization subroutine, a first data input subroutine, a second data input subroutine, a computing subroutine, a data output subroutine, and an end processing subroutine. Also, assume that when the program is executed with the amount N of inputted data=100, the number of executive instructions executed by a processor for the initialization subroutine is 800 steps, that for the first data input subroutine is 1,500 steps, that for the second data input subroutine is 800 steps, that for the computing subroutine is 900 steps, that for the data output subroutine is 800 steps, and that for the end processing subroutine is 600 steps.

Figure 13:
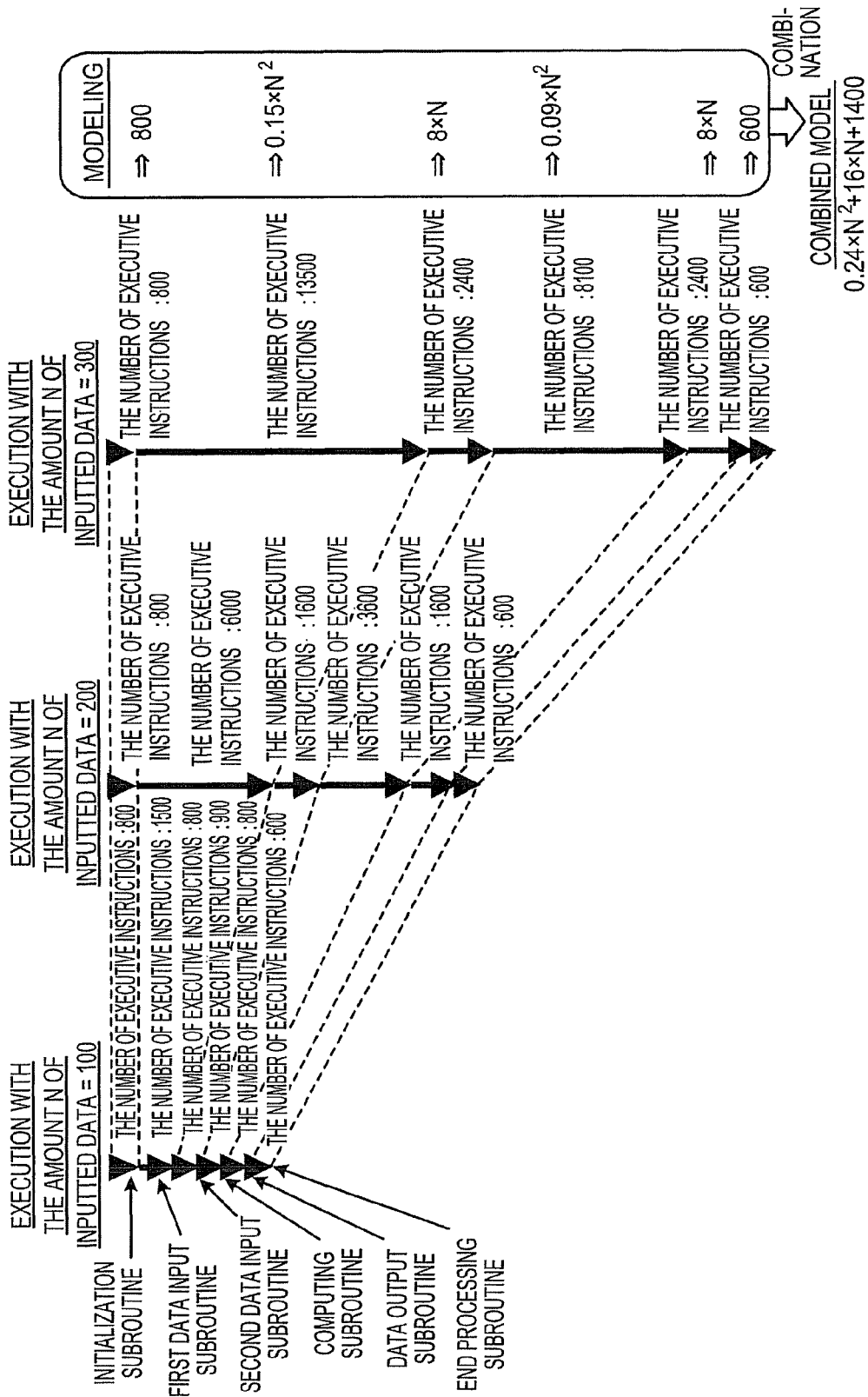
FIG. 13 illustrates a second embodiment.

Additionally, assume that when the program is executed with the amount N of inputted data=200, the numbers of executive instructions are as illustrated in the column for N=200 in FIG. 13 (e.g., the number of executive instructions for the initialization subroutine is 800 steps and that for the first data input subroutine is 6,000 steps). Similarly, assume that, in the case of the amount N of inputted data=300, the numbers of executive instructions for the respective subroutines are as illustrated in the column for N=300 in FIG. 13.

The estimation model creator 11 performs, for each subroutine, modeling for estimating the number of executive instructions for the amount N of data, on the basis of the numbers of executive instructions for each subroutine obtained for the respective amounts of inputted data. The modeling refers to the process of selecting, for each subroutine, a most suitable one among a plurality of model formulae defined in advance and calculating the coefficients of the model formula.

For example, since the number of executive instructions for the initialization subroutine is 800 operations regardless of the amount N of data, the number of executive instructions for the initialization subroutine is modeled as "800." The number of executive instructions for the first data input subroutine is modeled as "$0.15 \times N^2$" on the basis of the execution results at N=100, N=200, and N=300. Similarly, the number of executive instructions for any other subroutine is modeled as illustrated in the "modeling" column in FIG. 13. Note that mathematical formulae such as "800" and "$0.15 \times N^2$" will be referred to as executive instruction number estimation models hereinafter.

An estimation model combiner 12 combines executive instruction number estimation models obtained for the respective subroutines and creates a combined model. In the example in FIG. 13, the combined model "$0.24 \times N^2 + 16 \times N + 1,400$" is created by combining the executive instruction number estimation models for the respective subroutines.

The time estimator 4 obtains the total number of executive instructions by substituting the amount of inputted data intended for execution into a created combined model, and obtains an estimated time for instruction execution in consideration of the performance of the processor and the like.

In the first embodiment, the form of a model formula to be used for regression analysis is $\alpha \times N^3 + \beta \times N^2 + \gamma \times N + \delta$. In the second embodiment, the process of considering the candidacy of a model formula with another form will be described.

In the first embodiment, a coefficient which affects a result of calculating a model formula with the form $\alpha \times N^3 + \beta \times N^2 + \gamma \times N + \delta$ the most when the value of N is changed is $\alpha$ that is the coefficient of the term $N^3$. Take, as an example, the instruction execution section with an instruction execution section start address of 0x2a95c7255c and an instruction execution section end address of 0x2a95ba2fbc that is an instruction execution section for which the coefficient $\alpha$ has the largest value in the first embodiment. Assume that when the total numbers of executive instructions in section when N=100 to 1,000 are obtained for the instruction execution section, the result is as illustrated in FIG. 14.

When regression analysis is performed using a plurality of model formulae with respective forms as candidates, the model formula coefficient $\alpha$ and a coefficient of determination are obtained for each model formula with the form, as in FIG. 15. The closer the coefficient of determination is to "1", the smaller the deviation of an estimated value of the number of executive instructions obtained by a model formula from the actual number of executive instructions used to create the model formula. Accordingly, it can be judged that it is best to select the model formula with the form $\alpha \times N^3 + \beta \times N^2 + \gamma \times N + \delta$ in the example in FIG. 15. Note that the coefficient $\alpha$ is set as a coefficient which affects a mathematical formula the most in each candidate for the model formula, and the coefficient $\alpha$ is obtained in the second embodiment.

As described above, a plurality of candidates considered suitable for representing the processing amount of a program are prepared as the form of a model formula used for regression analysis. The estimation model creator 11 selects the most suitable form of the model formula by comparing the values of the coefficients of determination calculated for the model formulae with the respective forms.

In the second embodiment, the process of selecting a model formula on the basis of the total number of executive instructions in section for each instruction execution section has been described. In a third embodiment to be described below, a method for selecting a model formula by obtaining the number of times of section execution for each instruction execution section and the average number of executive instructions per single execution of an instruction execution section, and independently regressively analyzing the number of times of section execution and the average number of executive instructions obtained will be described. Note that an estimation model creator 11 is provided with a capability to be described in the third embodiment.

As for an instruction execution section illustrated in the second embodiment, the number of times of section execution described with reference to FIG. 6 in the first embodiment and the average number of executive instructions in section which is the average number of executive instructions per single execution of an instruction execution section for a problem size N are obtained. An example of the result is as illustrated in FIG. 16.

Each of the number of times of section execution and the average number of executive instructions in section is regressively analyzed using a plurality of model formulae with respective forms as candidates. A coefficient of determination and a coefficient $\alpha$ are obtained for each of the number of times of section execution and the average number of executive instructions in section for each of the model formulae with the respective forms, as in FIG. 17.

If the form of the model formula is selected for each of the number of times of section execution and the average number of executive instructions in section such that the coefficient of determination is closest to 1, the form $\alpha \times N^3 + \beta \times N^2 + \gamma \times N + \delta$ is selected for each of them. However, referring to corresponding values of the coefficient $\alpha$, the values are extremely small, 1.1655E-09 and −2.42726E-06, and it can be seen that a situation of overfitting has occurred. For this reason, the situation of overfitting is resolved by lowering the degree of a model formula to be selected and removing a model formula for which the coefficient $\alpha$ has an extremely small value. Finally, a model formula with the form $\alpha \times N + \beta$ is selected for the number of times of section execution, and a model formula with the form $\alpha \times N^2 + \beta \times N + \gamma$ is selected for the average number of executive instructions in section.

As described above, model formula selection based on the number of times of section execution and the average number of executive instructions in section makes it possible to more reliably estimate a model formula.

In the above-described first to third embodiments, a mathematical formula for estimating the number of executive instructions for the whole of a program is created by simply combining model formulae obtained by performing regression analysis for each instruction execution section. However, this method may cause the following problems:

model errors in model formulae for the respective instruction execution sections are accumulated, and a model error in a model formula for estimating the overall number of executive instructions becomes large; and program alteration processing performed to measure the cumulative number of executive instructions causes a measurement error to be included in the total number of executive instructions in section compiled for each instruction execution section, and the error in the model formula for estimating the overall number of executive instructions becomes obvious.

For this reason, in a fourth embodiment, after a combined model for estimating the number of executive instructions for the whole of a program is derived, a program execution time estimation apparatus 1 newly specifies the form of a model formula such as $\alpha \times N^3 + \beta \times N^2 + \gamma \times N + \delta$. After that, the program execution time estimation apparatus 1 performs regression analysis on the overall number of executive instructions of execution binary not having undergone alteration processing measured as in FIG. 18, using the specified model formula.

As a result, the coefficients of the model formula are obtained (e.g., $\alpha$=0.596712006, $\beta$=166.5791458, $\gamma$=7797.475833, and $\delta$=2318192.952). When the numbers of executive instructions for the whole program when N=1,000 to 10,000 are estimated using the model formula, the result in FIG. 19 is obtained. Note that actually measured values of the number of executive instructions for respective values of the problem size N are illustrated in the example in FIG. 19.

As seen from the result, an estimated error which is an error between an estimated value of the number of executive instructions and an actually measured value of the number of executive instructions is less than 0.2% in FIG. 19. It can be said that the processing amount of the whole program can be estimated with extremely higher accuracy than the result illustrated in FIG. 9.

The time estimator 4 according to the first embodiment obtains a processing amount per unit time from the hardware specifications of a computer. A time estimation portion 4 according to a fifth embodiment to be described below obtains a processing amount per unit time from an actually measured value.

For example, the time estimator 4 executes a program for which an execution time is to be estimated for only 5 seconds from the beginning, measures the average number of executive instructions per one clock of an internal clock of a processor at a time point after a lapse of 5 seconds, and calculates, for each problem size, the average number of executive instructions per one second from a measurement result. FIG. 20A illustrates an example of the average number of executive instructions per one clock and the average number of executive instructions per one second for each problem size.

In the fifth embodiment, the number of executive instructions for the whole of the program estimated by a model formula is divided by the average number of executive instructions per one second, like the first embodiment. An estimated instruction execution time is obtained as in FIG. 20B. As seen from FIG. 20B, an estimated error which is an error between an estimated execution time and an actually measured value of an execution time is less than 8% at the maximum. It can be said that a program execution time can be estimated with high accuracy.

In the fifth embodiment, the average number of executive instructions per one second is calculated by executing a program for which estimation is to be performed for only 5 seconds from the beginning of execution. However, how long the program needs to be executed to appropriately obtain the average number of executive instructions does not become evident by this method.

If a specific subroutine accounts for a dominant proportion (e.g., the processing amount of a certain subroutine is about, e.g., 95% of that of the whole program), the average number of executive instructions per one second in the subroutine can be also regarded as an appropriate value for the whole program.

Accordingly, in this case, a mathematical formula creator 3 of a program execution time estimation apparatus 1 measures the average number of executive instructions per one second of the subroutine which accounts for the dominant proportion by partially executing the program, e.g., measures the average number of executive instructions per one second times until a measurement result becomes sufficiently stable and regards the result as the average number of executive instructions per one second. This makes possible to explicitly consider a tradeoff between estimation result accuracy and the cost of execution for estimation in estimation of the average number of executive instructions per one second.

Note that a case where there is only one partial process that accounts for a dominant proportion of the processing amount of the whole of a program has been described in this example. The example can also be easily extended to a case where there are a plurality of subroutines which strongly affect the number of executive instructions for the whole of a program, by using a formula of the relation among the number of executive instructions for each subroutine, the average number of executive instructions per one second, and an overall execution time, as illustrated in FIG. 21. Note that N represents a problem size, and M represents the number of subroutines which strongly affect the number of executive instructions for the whole program in FIG. 21. The value of M is determined by judging whether the number of executive instructions for a certain subroutine is not less than a predetermined portion of the number of executive instructions for the whole program. Time(N) represents the execution time of the whole program for the problem size N, Instr(N,i) represents the number of executive instructions for a subroutine that ranks i-th highest in the extent to which the subroutine affects the processing amount of the whole program for the problem size N, and IPS(N,i) represents the average number of executive instructions per one second of the subroutine that ranks i-th highest in the extent to which the subroutine affects the processing amount of the whole program for the problem size N.

That is, if there is a plurality of subroutines which strongly affect the processing amount of the whole program, a mathematical formula creator 3 and a time estimator 4 implement an embodiment by being provided with the capabilities below.

The mathematical formula creator 3 according to the embodiment in FIG. 21 has the capability of specifying a subroutine whose number of executive instructions is not more than the predetermined proportion of the number of executive instructions when a program is executed. The time estimator 4 according to this embodiment has the capability of calculating an estimated execution time when the program is executed, using the number of executive instructions for each subroutine specified by the mathematical formula creator 3 and the formula illustrated in FIG. 21.

An execution time estimation apparatus 1 with the above-described configuration performs measurement for each subroutine times until a measurement result becomes sufficiently stable and obtains the average number of executive instructions per one second in each subroutine. The program execution time estimation apparatus 1 separately divides the processing amounts of the subroutines by the obtained average numbers of executive instructions per one second and adds together the execution times of the respective subroutines as division results. With this operation, it is possible to estimate the execution time of the whole program.

According to the first embodiment, the capability of obtaining the value of the number of executive instructions for each of a main program and all subroutines in a math library to be called by the main program is obtained and outputting the value to a log is added to a program for which estimation is to be performed. However, if a program in which the number of times subroutines are called is large is used as a targeted program, this method causes the following problems:

the time required for log output processing is not negligible; and the time required for the process of compiling a generated log is long.

Accordingly, in this case, the following capabilities are added to the log output capability to be added to the targeted program by alteration processing:

newly providing a variable indicating a subroutine call depth and initializing the variable to 0 at the beginning of execution of a corresponding altered program; and incrementing the variable by 1 at the beginning of each subroutine and decrementing the variable by 1 at the end of the subroutine.

In this embodiment, the value of the number of executive instructions is obtained and is output to a log only if the value of the variable is not more than a threshold value.

The addition makes possible to suppress the amount of a generated log while maintaining the granularity of a partial process whose number of executive instructions is to be measured at an appropriate level and avoid the above-described two problems.

In the above-described embodiments, instruction execution sections delimited on the basis of subroutines are regarded as partial processes, a mathematical formula is calculated for each instruction execution section, and the calculated mathematical formulae are combined. However, instruction execution sections delimited on the basis of repetitive processes using a FOR statement or the like may be regarded as partial processes.

In the above-described embodiments, the number of executive instructions of a processor is obtained, and processing is performed on the basis of the number of executive instructions. However, the number of times the processor executes an arithmetic operation may be used.

In the above-described embodiments, the amount of inputted data to be inputted to a program has been described as the problem size N. However, any one of the spatial resolution of processor calculation processing, the temporal resolution of processor calculation processing, the number of repetitions of a time step in processor calculation processing, and the number of repetitions of repeated calculation in processor calculation processing, or a combination thereof may be used as the problem size.

The above-described embodiments improve the work of estimating the execution time of a computer program, as described below.

A program execution time estimation apparatus according to any of the above-described embodiments is capable of performing high-accuracy execution time estimation without deeply understanding the processing contents of a program for which estimation is to be performed.

A program execution time estimation apparatus according to any of the embodiments is capable of performing execution time estimation with markedly higher accuracy than a method of estimating an execution time only from an actually measured value of an elapsed time related to the whole of program execution.

A program execution time estimation apparatus according to any of the embodiments is capable of, even in the case of a program for which an execution time estimation model cannot be easily created, specifying a portion for which estimation is not easily performed on a subroutine basis or on a basis of a repetitive process using a FOR statement and performing manual estimation work with much less labor than a method for understanding the whole program.

It is possible to provide, as a statistics estimation program, a program which is caused to execute the above-described operations in a computer constituting the program execution time estimation apparatus 1 serving as a statistics estimation apparatus. The above-described program can be executed by a computer constituting a statistics estimation apparatus by being stored in a computer-readable recording medium. Examples of the computer-readable recording medium include an internal storage device built in a computer, such as a ROM or RAM, a portable storage medium such as a CD-ROM, flexible disk, DVD disk, magneto-optical disk, or IC card, a database holding a computer program, another computer and a database thereof, or an online transmission medium.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A statistics estimation apparatus, comprising:

an executing unit to execute a program using a plurality of data subsets of data intended for execution to perform a plurality of partial processes of the program, respectively, each of the data subsets including a number of pieces of data smaller than a number of pieces of the data intended for execution, and calculates a partial process statistic for each of the plurality of the data subsets and each of the plurality of the partial processes, the partial process statistic serving as a statistic of a processor which executes the partial process;

a mathematical formula generator to generate a mathematical formula for calculating an overall statistic on the basis of the calculated partial process statistic for each of the partial processes and the number of pieces of data used for execution of the program when the partial process statistic is calculated, the overall statistic serving as a statistic of the processor when a whole of the program is executed with the number of pieces of the data intended for execution; and a calculator that calculates an estimated statistic when the program is executed with the number of pieces of the data intended for execution, on the basis of the mathematical formula generated by the mathematical formula generator.

2. The statistics estimation apparatus according to claim 1, wherein the calculator calculates an estimated execution time when the program is executed with the number of pieces of data intended for execution on the basis of the mathematical formula generated by the mathematical formula generator.

3. The statistics estimation apparatus according to claim 1, wherein the mathematical formula generator includes a regression formula generator which calculates, for each of the partial processes, a coefficient of a model formula for regression analysis on the basis of the partial process statistic calculated by the executing unit and the number of pieces of data and generates, for each of the partial processes, a regression formula by setting the calculated coefficient in the model formula, and a regression formula combiner which combines the regression formulae for the respective partial processes generated by the regression formula generator and generates the mathematical formula.

4. The statistics estimation apparatus according to claim 3, wherein the regression formula generator selects, for each of the partial processes, a most suitable one among a plurality of model formulae defined in advance and uses the selected model formula as a model formula for the partial process.

5. The statistics estimation apparatus according to claim 4, wherein the regression formula generator calculates coefficients of determination of the plurality of model formulae for each of the partial processes and selects one most suitable for the partial process on the basis of the calculated coefficients of determination.

6. The statistics estimation apparatus according to claim 1, wherein the executing unit and the mathematical formula generator use, as each of the partial processes, an instruction execution section delimited on the basis of subroutines constituting the program.

7. The statistics estimation apparatus according to claim 4, wherein when a model formula is to be selected for each of the partial processes, the regression formula generator obtains the number of times the processor executes the partial process, calculates the partial process statistic per single execution of the partial process, and selects a model formula for each of the partial processes on the basis of the number of times of execution and the partial process statistic per single execution.

8. The statistics estimation apparatus according to claim 2, wherein the estimation time calculator measures a predetermined statistic per one clock of the processor after a lapse of a predetermined time, calculates the predetermined statistic per unit time from a measurement result, divides the overall statistic by the predetermined statistic per unit time, and calculates an estimated execution time when the program is executed with the number of pieces of data intended for execution.

9. The statistics estimation apparatus according to claim 1, wherein the partial process is an instruction execution section delimited on the basis of a repetitive process.

10. The statistics estimation apparatus according to claim 1, wherein the predetermined statistic is the number of times the processor executes an arithmetic operation.

11. The statistics estimation apparatus according to claim 1, wherein the executing unit and the mathematical formula generator use the number of executive instructions of the processor as the predetermined statistic.

12. A non-transitory computer-readable medium storing therein a statistics estimation program including computer instructions for causing a computer to perform:

executing, a program using a plurality of data subsets of data intended for execution to perform a plurality of partial processes of the program, respectively, each of the data subsets including a number of pieces of data smaller than a number of pieces of the data intended for execution, and calculating a partial process statistic for each of the plurality of data subsets and each of the plurality of the partial processes, the partial process statistic serving as a statistic of a processor which executes the partial process;

generating a mathematical formula for calculating an overall statistic on the basis of the calculated partial process statistic for each of the partial processes and the number of pieces of data used for execution of the program when the partial process statistic is calculated, the overall statistic serving as a statistic of the processor when a whole of the program is executed with the number of pieces of the data intended for execution; and calculating an estimated statistic when the program is executed with the number of pieces of the data intended for execution, on the basis of the generated mathematical formula.

13. The non-transitory computer-readable medium storing therein the statistics estimation program according to claim 12, wherein when the estimated statistic is to be calculated, an estimated execution time when the program is executed with the number of pieces of data intended for execution, on the basis of the generated mathematical formula.

14. The non-transitory computer-readable medium storing therein the statistics estimation program according to claim 12, further comprising:

calculating, for each of the partial processes, a coefficient of a model formula for regression analysis on the basis of the calculated partial process statistic and the number of pieces of data and generating, for each of the partial processes, a regression formula by setting the calculated coefficient in the model formula; and generating the mathematical formula by combining the generated regression formulae for the respective partial processes.

* * * * *